July 22, 1969  T. W. MARTINEK  3,456,286
HIGH DENSITY SHIRRING OF SAUSAGE CASINGS
Filed Nov. 25, 1966  4 Sheets-Sheet 1

THOMAS W MARTINEK
*INVENTOR.*

BY
his attorney

THOMAS W MARTINEK
INVENTOR.

THOMAS W MARTINEK
INVENTOR.

July 22, 1969  T. W. MARTINEK  3,456,286
HIGH DENSITY SHIRRING OF SAUSAGE CASINGS
Filed Nov. 25, 1966  4 Sheets-Sheet 4

THOMAS W. MARTINEK
*INVENTOR.*

BY  *his attorney*

United States Patent Office 3,456,286
Patented July 22, 1969

3,456,286
HIGH DENSITY SHIRRING OF SAUSAGE CASINGS
Thomas W. Martinek, Danville, Ill., assignor to Tee-Pak, Inc., a corporation of Illinois
Filed Nov. 25, 1966, Ser. No. 597,057
Int. Cl. A22c *13/00, 11/00*
U.S. Cl. 17—49        6 Claims

ABSTRACT OF THE DISCLOSURE

In the shirring of artificial sausage casings, e.g. regenerated cellulose, amylose, alginate, collagen casings, etc. wherein a flattened tubular casing is withdrawn from a storage reel, inflated over a mandrel, and mechanically shirred by application of shirring forces around the periphery of the inflated casing, a shirred strand of more uniform pleat structure and higher pleat density is obtained by shirring the casing against a retractable holdback means which is withdrawn at a rate of one inch per 5 to 10 feet of casing shirred while maintaining the inflated casing at an internal pressure of 8–25 p.s.i.g. Additional ram compression of the shirred strand may be used but is not necessary to the production of uniform, high-density shirred strands.

BACKGROUND OF THE INVENTION

This invention relates to new and useful improvements in the shirring of artificial sausage casings and more particularly to a novel method for shirring such casings to produce a shirred product having a uniform high density shirring pattern.

Artificial sausage casings, particularly casings formed of regenerated cellulose, amylose, collagen, alginates, etc., are prepared as hollow thin walled tubes of substantially indefinite lengths. For convenience in handling, these casings are shirred from lengths ranging from 40–160 feet or more down to a shirred and compressed length of the order of a few inches.

Artificial sausage casings were first shirred by hand in the same manner as natural gut casings. Artificial sausage casings were inflated with compressed air and shirred on a hollow tube by hand. The earliest shirring machines duplicated the function of the shirring operator's hand in compressing the inflated casing and collapsing it into accordion type pleats. An early shirring machine working on such a principle is that shown in Dietrich U.S. Patent 2,010,626. In Korsgaard U.S. Patent 2,583,654, an improved shirring machine is described having an automatic turret arrangement for essentially continuous, but intermittent shirring operation. The Korsgaard machine, however, is one in which the shirring forces were applied by shirring dogs carried at intervals of about six or eight inches on an endless chain. The shirring dogs would grasp the inflated casing and collapse it into essentially accordion type pleats in much the same manner as the hand of a hand shirring operator.

In Blizzard et al. U.S. Patents 2,722,714, 2,722,715, and 2,723,201, there are described an improved method and apparatus in which the casing is inflated over a hollow shirring mandrel and shirred by shirring lugs carried on endless, flexible belts. The shirring lugs were closely spaced, e.g., about ¾ inch, and staggered so that the space opposite any given shirring lug would be free from application of any shirring force. This arrangement of shirring belts and lugs usually involved a pair of shirring belts although the use of three or four or more belts for a similar purpose is disclosed. The improved method and apparatus described in the Blizzard et al. patents resulted in the production of shirred casing which was superior in many respects and represents the process by which a substantial majority of shirred casing is manufactured throughout the world today.

In Matecki U.S. Patents, 2,983,949 and 2,984,574 there are shown and described an apparatus and process for shirring artificial sausage casings which represent a slight modification on the principles set forth in the Blizzard et al. patents. The Matecki patents disclose the use of shirring wheels in the place of shirring belts, which has some slight advantage in that shirring wheels are easily molded and are less expensive than shirring belts. Also the Matecki patents disclose the use of a three-wheel or four-wheel shirring arrangement which produces a shirring effect which is essentially identical to that produced by the three belt and four belt shirring arrangements shown in the Blizzard et al patents. Clement U.S. Patent 3,266,911 discloses shirring wheel arrangements wherein the shirring lugs are aligned around the casing but apply shirring forces at closely spaced intervals.

The shirring processes and apparatus which are described in the prior art and which were in prior commercial use have had the disadvantage that there was a discontinuity in the application of shirring force to the casing being shirred with the result that irregularities would occur in the formation of shirred pleats of casing. In particular, shirring machines of the type disclosed in the Blizzard et al. and Matecki patents have produced shirred casings in which the casing material is pleated in a form approximating a spiral pleat extending continuously around the casing.

The application of shirring forces in these machines was intermittent and spaced around the periphery of the casing with the application of shirring forces applied at spaced intervals. While these machines have produced commercially satisfactory casings it was considered desirable to develop a shirring method and machine in which the shirring force could be applied continuously around the periphery of the casing so that the casing would be formed into a true helical pleat with substantially no intervening folds occuring at pleats between the application of successive shirring forces. In the co-pending patent application of L. C. Arnold Ser. No. 564,961 filed July 13, 1966, there is described an improved method and/or apparatus in which artificial sausage casings are shirred more uniformly by application of shirring forces in a true helical shirring pattern. The apparatus used involves the use of shirring wheels or belts having shirring lugs or other shirring force applying means which are set at an angle in relation to the direction of rotation and thus engage the casing along a substantial continuous helical line and forms substantially continuous helical pleats in the casing. The formation of such continuous helical pleats resulted in shirred strands which were straighter and about 5 to 10% shorter than those previously produced.

In the prior art methods and apparatus as exemplified by the patents and patent application referred to above, artificial sausage casings were inflated and shirred into as uniform a pleat pattern as could be obtained on the particular apparatus used. The prior art machines would shirr casing into pleats up to a maximum of about 4.5 feet of casing per inch of pleated casing. The shirred casing which was produced, at a density of about 4.5 feet of unshirred casing per inch of shirred casing, was then compressed by some form of ram while still on the shirring mandrel to produce a shirred and compressed casing strand having a maximum density of about 6 feet of unshirred casing per inch of shirred and compressed strand. Such high ram compression resulted in non-uniform strand densities. As the casing was compressed it would tend to bind on the shirring mandrel and thus the density of the compressed strand would be progressively greater as measured toward the point of application of the ram compression. High ram compression has been found to result in non-uniform strand densities and produces strands which tend to curl or snake after being doffed from the mandrel. This has resulted in the necessity for maintaining very critical adjustments in the shirring machine to produce satisfactory shirred casings. It has also been found that the production of highly compressed casings by ram compresion frequently results in strands having minute breaks or pin holes in the casing which render the strands essentially useless because of breakage at the time of stuffing.

OBJECTS AND FEATURES OF THE INVENTION

It is therefore one object of this invention to provide a new and improved method for shirring of artificial sausage casings wherein a high density shirred casing strand is produced having a stirred density of 5 to 10 feet of unshirred casing per inch of shirred casing.

Another object of this invention is to provide a new and improved method of shirring artificial sausage casings wherein a high density shirred strand of casing is produced which is substantially uniform in density from end to end.

Still another object of this invention is to provide a new and improved shirred casing strand having an uncompressed shirred density in excess of five feet of unshirred casing per inch of shirred casing strand and is essentially uniform in shirred density from end to end.

A feature of this invention is the provision of a new and improved method for producing high density shirred artificial sausage casing strands wherein an inflated casing is shirred by application of alternate closely spaced shirring forces, the casing being shirred against a retractable hold-back means which is withdrawn from the point of application of shirring forces at a rate of one inch per 5 to 10 feet of casing shirred.

Another feature of this invention is the provision of a new and improved shirred strand of artificial casing having an uncompressed density in excess of five feet of unshirred casing per inch of shirred casing and essentially uniform density of shirred pleats from end to end of the shirred casing strand.

Other objects and features of this invention will become apparent from time to time throughout the specification and claims as hereinafter related.

SUMMARY OF THE INVENTION

This invention comprises a new and improved shirring method in which an artificial sausage casing is fed over a shirring mandrel and inflated with compressed air and shirred. The inflated casing is shirred by application of force from lugs or other means on the surface of shirring wheels or belts positioned equi-angularly around the periphery of the casing and arranged to engage the casing to form pleats therein. The lugs or other shirring means for application of shirring forces to the casing, positioned on the belts or wheels, are arranged to engage and indent the inflated casing at successive positions around the periphery of the casing and form the casing into a shirred strand. As the casing is pleated or shirred the pleats are formed against a hold-back means which effects a compression of the individual pleats as formed by the shirring belts or wheels. The hold-back means which define the amount of compression produced by the shirring belts or wheels on the initially formed uncompressed shirred strand is arranged to be retracted from the shirring belts or wheels at a rate of one inch per 5 to 10 feet of casing shirred. By this arrangement, I have found that highly compressed shirred strands of casing can be produced off of the shirring wheels and that further compression of the shirred strand is unnecessary in most cases. In other cases where even higher degree of compression of the shirred strand is required the highly compressed casing from the shirring wheels can be subjected to a further ram compression.

The primary purpose of high wheel compression shirring is to increase the amount of casing which can be pleated into a given length of strand. Other benefits, aside from increased density, are inherent in the process. The shirred strands have been found to be much more uniform in density. The strands are straighter than could be made in the past and are more rigid and smoother looking. The shirred strands are stronger and more resistant to breakage and have less defects per unit length of casing in the strand. The advantages of this process are considerable and result in a shirred strand which is highly attractive commercially.

Prior art machines, such as those of Blizzard et al. or Matecki, may be used to prepare high wheel compression strands after certain modifications have been made to permit greater wheel compression (the compression of the shirred pleats which occurs by the pressure applied solely from the shirring wheels or belts). Prior art machines have been set up to pleat casing to a maximum degree of compression of about 4.5 feet of casing per inch of shirred, uncompressed strand. This low density strand is then compressed by some form of ram while still on the mandrel to a maximum density of about 6 to 7 feet of casing per inch of shirred strand. Such high ram compression results in non-uniform strand densities (strand density may vary as much as 10 to 20% or more from end to center to the opposite end). High ram compression also results in strands that have some tendency to curl or snake after being doffed from the shirring mandrel, thus necessitating very critical adjustments to produce uniform strands. The high ram compression also frequently results in strands having casings with pin holes or breaks which render the strands useless because of losses to the meat packer due to casing breakage in stuffing.

In this process the strand hold-back means is adjusted in traverse rate by a PIV (positive, infinitely variable) transmission between the drive from the wheels and the hold-back means to give a strand density in the range from about 5 to 9 feet of casing per inch or shirred casing. I have found that by appropriate variation of the traverse rate of the hold-back means, accompanied by suitable control of lubrication of the casing and internal air pressure, that strand densities as high as nine feet of casing per inch of shirred strand may be produced without additional ram compression. Subsequent ram compression may or may not be used in connection with the shirred casing depending upon the ultimate degree of compression required in the product. Densities as high as ten feet per inch can be obtained with subsequent ram compression. Without ram compression, strand densities may be obtained which are absolutely uniform throughout the length of the strand. The strand is perfectly straight even when the pleats are asymmetrically formed thus making critical alignments in the shirring machine unnecessary. The amount of ram compression which can be employed to further increase strand density without causing defects varies with the amount of compression obtained from the shirring wheels or belts, decreasing as the amount of wheel or belt compression increases. Thus, with a wheel compression density of about five feet of casing per inch or shirred strand, the maximum density achievable without causing defects is about seven feet of casing per inch of shirred strand. With the wheel compression density of six feet per shirred inch the maximum density obtained with additional ram compression is about eight feet per shirred inch. The maximum density obtained with presently available equipment is about ten feet per shirred inch, produced by ram compression of casing shirred to a density of nine feet per shirred inch off of the shirring wheels.

The results that were obtained with high wheel or belt compression were completely unexpected since it had been formerly believed that strand defects were caused by the folding, rubbing and compressing action of the shirring wheels working against the casing. The results of my experiments show, however, that the wheels do not ordinarily damage the casing despite high strand back pressures provided the wheels and mandrel are properly lubricated and the casing wheels and mandrel relationships are such as to form a strand which does not bind on the mandrel, the wheels are sufficiently rigid and/or the strand moves continuously and uniformly away from the shirring wheels or belts as it is formed. The novel process embodying this invention and the novel shirred casing product produced thereby will be described more fully hereinafter with reference to the various drawings.

DESCRIPTION OF THE DRAWINGS

In the accompnaying drawings, to be taken as a part of this specification, there are clearly and fully illustrated several preferred embodiments of this invention, in which drawings.

DESCRIPTION OF THE INVENTION

This invention is based upon my discovery that synthetic sausage casings can be shirred into more compact straight strands by application of shirring forces symmetrically to an inflated casing at relatively short distances along the inflated casing while retarding the withdrawal of the shirred product to a degree such that the application of shirring forces also provides the required degree of compression of the shirred product. In particular, the improvement of this invention resides primarily in the shirring of synthetic sausage casings wherein the shirred product is moved away from the means for application of shirring forces at a rate of one inch per 5 to 10 feet of casing shirred. This is accomplished by providing a means for holding back to the movement of shirred casing under the influence of the shirring force applying means and retracting said hold-back means at the aforementioned rate to insure that the casing is compacted to the desired density by action of the shirring force applying means.

Figure 1:
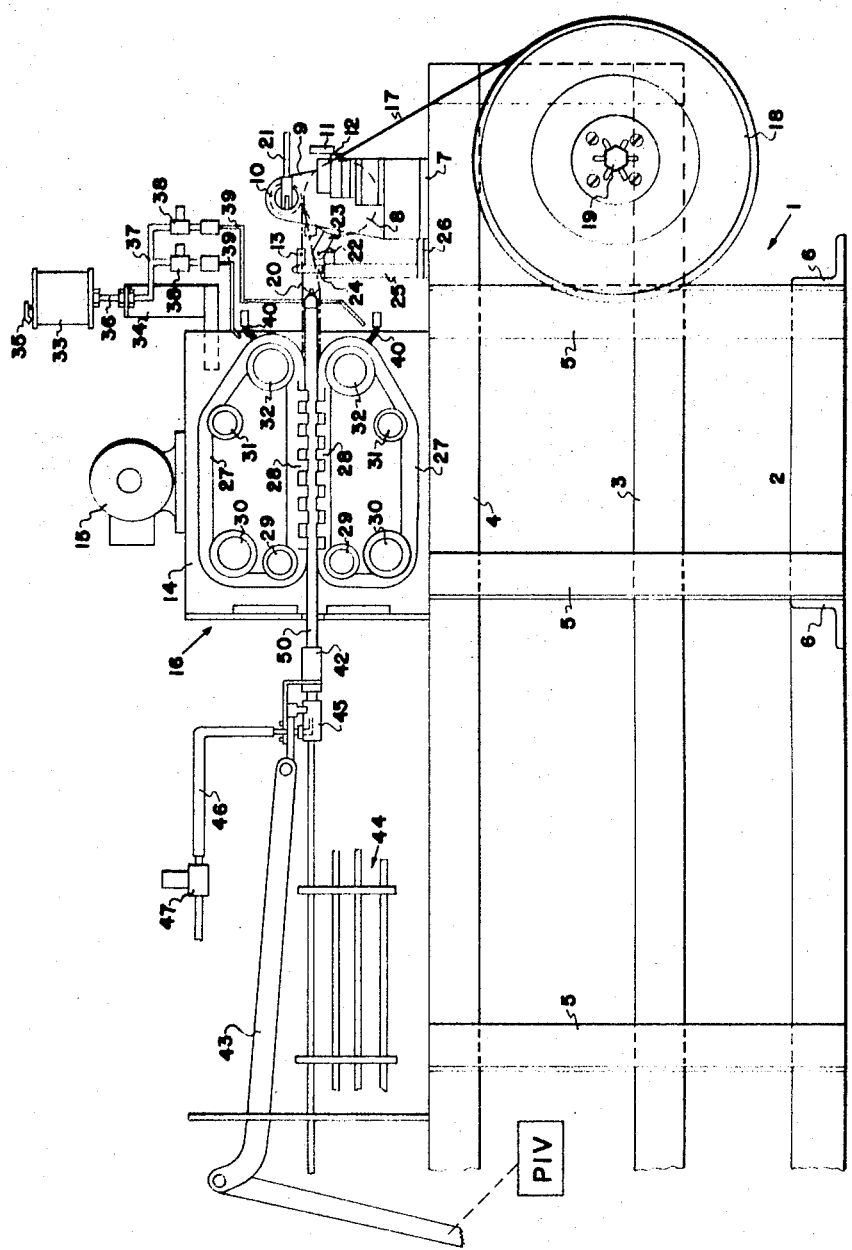
FIG. 1 is a view in elevation of a shirring machine embodying one form of this invention, utilizing lugged belts for shirring.

Referring now to FIG. 1 of the drawings, the improved process of this invention is illustrated as applied in an apparatus of the type shown in the aforementioned Blizzard et al. patents. In comparing the apparatus of FIG. 1 with the corresponding figure in the Blizzard et al. patents, the same reference numerals are not used for the same part shown in that patent, but the correspondence of parts and manner of operation will be apparent.

In FIG. 1, there is shown an angle-iron, welded frame 1 which includes the bottom longitudinal supporting angle 2, an intermediant longitudinal supporting angle 3, a top longitudinal angle 4, and upright supporting angles 5. The remaining portions of frame 1 are disclosed in more detail in FIG. 1 of the Korsgaard U.S. Patent 2,583,654 to which reference is made for a more complete understanding of the same. Frame 1 also includes transversely extending supporting angles 6. Mounted on the top supporting angle 4 and on a corresponding angle on the opposite side is supporting plate 7 which carries a measuring roll 8. Measuring roll 8 is rotatably mounted between support plates 9 which also support a rotatable squeeze roll 10. Cooperating with measuring roll 8 is a metering disc 11 that is arranged to operate a measuring limit switch 12 for stopping further operation of the shirring head when a predetermined length of casing has been shirred.

In the Blizard et al. and Korsgaard patents, there is explained in greater detail the employment of the tear limit switch for stopping further action of the shirring head in the event that the casing is torn. The tear limit switch is operated by roll 13 which engages the upper side of the casing.

Mounted on angle iron frame 1 are shirring head side plates 14 which constitute the framework for the shirring head, further details of which will be described hereinafter. Mounted on side plates 14 is a shirring head motor 15 that is suitably controlled for starting, driving, and stopping the shirring head which is generally referred to as 16.

The shirring head 16 is arranged to receive a relatively thin-walled synthetic sausage casing 17 from a reel 18 that is rotatably mounted on shaft 19. As the casing 17 comes from reel 18, it is flat and sometimes referred to as reelstock. The reelstock fed from reel 18 passes between measuring roll 8 and squeeze roll 10 and is inflated by compressed air as shown at 20. The compressed air for inflation of the casing is introduced through the hollow shirring mandrel 50 as shown in more detail in FIG. 5 of the drawings. It will be observed that squeeze roll 10 can be positioned by handle 21. Immediately below the roller 13 which operates the tear limit switch and on the underside of the inflated casing 20 is a roller 22 which is carried by arm 23 and operates to limit the downward movement of roller 13 when the casing is deflated.

The casing is drawn over mandrel 50 which has a central longitudinal aperture through which air flows under a slight pressure to inflate the casing to its full diameter and thus facilitate the shirring operation. The mandrel and central aperture are shown in more detail in FIG. 5. The central aperture in the shirring mandrel provides an opening for introduction of air for inflating the casing and a lubricant or coating material, if necessary, into the interior of the casing.

The inflated casing 20 passes over mandrel 50 into the shirring head 16 between guide rollers 24 which are mounted on vertical supports 25 that are in turn mounted on the ends of arm 26 secured to and extended from plate 7. Using shirring head 16, constructed as herein disclosed, and with appropriate changes in the openings in the shirring dogs or lugs, it is possible to shirr a wide range of sizes of thin-walled tubes or synthetic sausage casings. Casings or tubings with which this invention can be employed range in thickness from about 1–10 mils. and in length from about 30–200 ft. While reel 18 contains an indefinite length of casing, the casing wound thereon is eventually cut into lengths of the order of 30–200 ft., depending upon the end use requirements of the casing or tubing. The resulting lengths of casing are shirred onto the mandrel by shirring head 16 and the shirred casing cut off in predetermined desired lengths.

The internal diameter of the casing with which this apparatus can be employed ranges from about ½ to about 2 inches. While the apparatus is primarily used in the shirring of thin-walled cellulosic casing, it may be used in the shirring of other artificial tubular casings, such as fibrous casing, amylose or starch film casing, collagen film casing, alginate film casing, thin-walled tubes of various thermoplastic materials, etc. The shirring head shown in this figure can be used in conjunction with a turret as described in the Korsgaard patent, or a floating mandrel arrangement as described in the Dietrich patent, or other similar arrangement.

Shirring head 16 includes upper and lower shirring belts 27 which have a plurality of staggered, spaced shirring lugs 28 which are offset or staggered in relation to each other (if the lugs 28 are sufficiently closely spaced they may be positioned in opposed relation rather than staggered as shown). Belts 27 are supported on pulleys or wheels 29, 30, 31 and 32. Motor 15 is connected by a drive pulley or other suitable drive mechanism (not shown) to one of the wheels supporting shirring belts 27 and is operable to drive the belts to shirr the tubing or casing 20. The lower shirring belts 27 is driven by a motor and pulley arrangement which is not shown but which can be seen in FIG. 1 of the Blizzard et al. patent. Upper and lower shirring belts 27 are driven in coordination with the shirring lugs 28 arranged to engage and shirr casing 20 on shirring mandrel 50. The shirred casing is eventually severed and compressed on a storage mandrel or on the outer end of mandrel 50 if a floating mandrel construction is used. After compression, the shirred casing is discharged to a suitable storage hopper where the shirred strand is removed and placed in a box for shipment.

An oil (or other lubricant) storage tank 33 is supported by plates 34 and secured to shirring head plate 14. Storage tank 33 has an inlet opening 35 and a bottom outlet opening connected to tubing 36 which is in turn connected to a manifold 37. Manifold 37 is connected to valves 38 and outlet tubes 39 which are arranged to supply lubricant to brushes 40 positioned for engagement with shirring belts 27. The oil or other lubricant which is placed in storage tank 33 is supplied to brushes 40 for contact with shirring belts 27 and provides lubrication for the external surface of the tubing or casing being shirred to prevent mechanical damage due to shirring abrasion.

Shirring mandrel 50 is provided with a collar 42 and actuating arm 43 for reciprocal movement of the mandrel into and out of the shirring head. Actuating member 43 is operated in association with the movement of turret 44 consisting of a plurality of separately actuated and rotatable mandrels as described in Korsgaard patent 2,583,654. The apparatus is provided with a positive, infinitely variable drive, designated PIV, positioned for actuation by motor 15 (or other suitable power source) which is operatively connected to actuating member 43 to control the rate of withdrawal of mandrel 50 from shirring head 16. The casing which is shirred onto mandrel 50 is restricted in its movement by sleeve member 42. The casing is therefore shirred against sleeve 42 and compressed successively against previously shirred casing. The rate of withdrawal of mandrel 50 from shirring head 16 by the PIV determines the degree of compression of the shirred product effected by shirring belts 27. The PIV is adjusted to retract mandrel 50 from shirring head 16 at a rate of one inch per 5–10 feet of casing shirred by belts 27.

Mandrel 50 is also provided with a suitable connection indicated at 45 which is connected through flexible tubing 46 to valve 47 for supply of compressed air and liquid for lubricating or coating the inside surface of the tubing casing being shirred in the machine. Valve 47 is preferably arranged to meter a small amount of lubricant or liquid coating material which is to be applied to the inner surface of the tubing or casing being shirred. Valve 47 meters the coating liquid into the stream of air which is used to inflate the casing or tubing during shirring.

Figure 5:
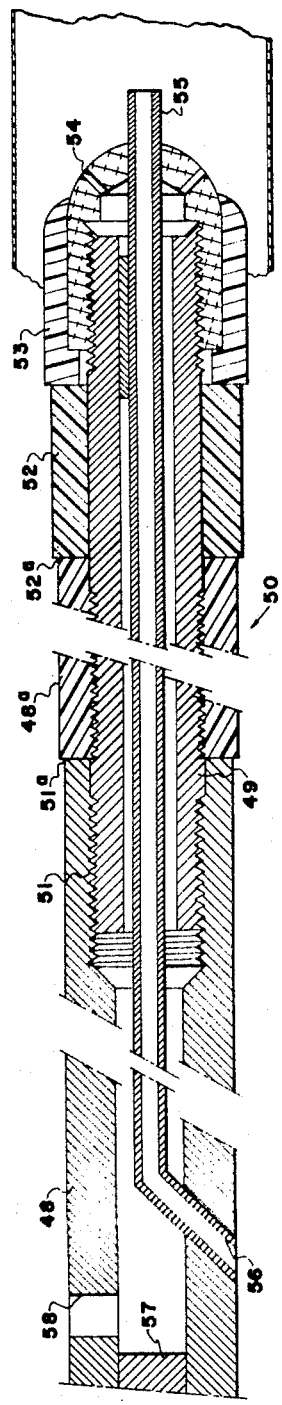
FIG. 5 is a view in cross section of the leading end portion of the shirring mandrel.

In FIG. 5 there is shown a detail sectional view of mandrel 50 illustrating the introduction of a coating material or lubricant through the mandrel to coat or lubricate the inside surface of the tubing or casing being shirred in the apparatus. Mandrel 50 comprises hollow tubular portions 48 and 49. Tubular portion 49 is threadedly connected within tubular portion 48 as indicated at 51. Tubular portion 49 is surrounded by sleeve 52 of plastic and abuts against cup-shaped cap assembly 53 (also made of plastic). The cap assembly 53 is constructed of two parts and is provided with passages 54 for spraying a coating or lubricating material. The mandrel is also provided with outlet tube 55 which extends through cap assembly 53 and mandrel portion 49 into outlet passage 56. A tubular sleeve portion 48a is secured on tubular mandrel portion 49 between plastic sleeve 52 and mandrel portion 48. There is a shoulder or drop-off 52a between members 48a and 52 and a second shoulder or drop-off 51a between members 48 and 48a. These drop-offs facilitate the removal of shirred casing along the mandrel. Tubular mandrel portion 48 is closed by a suitable plug closure 57 and is provided with inlet openings 58 for introduction of air and coating or lubricating fluid. In the assembly shown in FIG. 1, inlet opening 58 is connected to flexible tubing 46 for introduction of compressed air and coating or lubricating fluid.

In operation, the apparatus functions as a shirring machine as described in the Blizzard et al. and the Korsgaard patents. Tubular material or casing 17 is drawn from reel 18 and inflated as indicated at 20 by compressed air introduced into the interior of the casing through the hollow interior of mandrel 50. The shirring belts 27 grip the inflated casing or tubing and form it into a pleated or shirred strand. The pleated or shirred strand of tubing or casing has a predetermined uniform degree of compression which is determined by the rate of withdrawal of mandrel 50 from shirring head 16 by the PIV. The rate of withdrawal of mandrel 50 by the PIV is adcasing shirred by belts 27. This results in a shirred strand of casing of very high and uniform density. The pleats are very uniform from end to end of the shirred strand. In fact, where the pleat density of prior art shirred strands varies as much as 20 or 25% from end to middle to end of shirred strand, the pleat density when shirred in accordance with this invention varies less than about 10% in most cases and in many cases less than 1% when measured from end to middle to opposite end of the strand.

Figure 6:
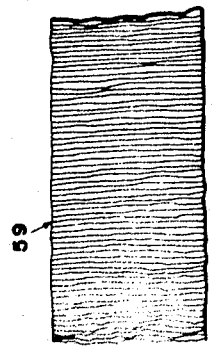
FIG. 6 is a view in elevation of a shirred strand of casing produced in accordance with this invention.
Figure 7:
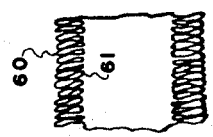
FIG. 7 is an exaggerated view in cross section showing the pleat structure of the shirred strand of FIG. 6.
Figure 8:
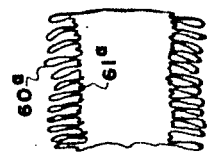
FIG. 8 is an exaggerated view in cross section of a prior art shirred strand showing the less dense pleat structure.

The pleated strand of casing or tubing is severed from the unshirred portion of the casing and may, if desired, be further compressed in the compression portion of turret 44, and finally doffed from the storage mandrel for packaging. The shirred strand 59 which is produced in accordance with this invention is shown in elevation in FIG. 6 and in an exaggerated cross section of FIG. 7. The cross section shown in FIG. 7 consists of a plurality of very tightly compacted major pleats 60 and minor pleats 61. The high degree of compaction of pleats 60 and 61 is effected during the shirring of the casing and results in a very uniform pleat density. In FIG. 8, a similar section is shown of a prior art casing having less dense major pleats 60a and minor pleats 61a.

Figure 2:
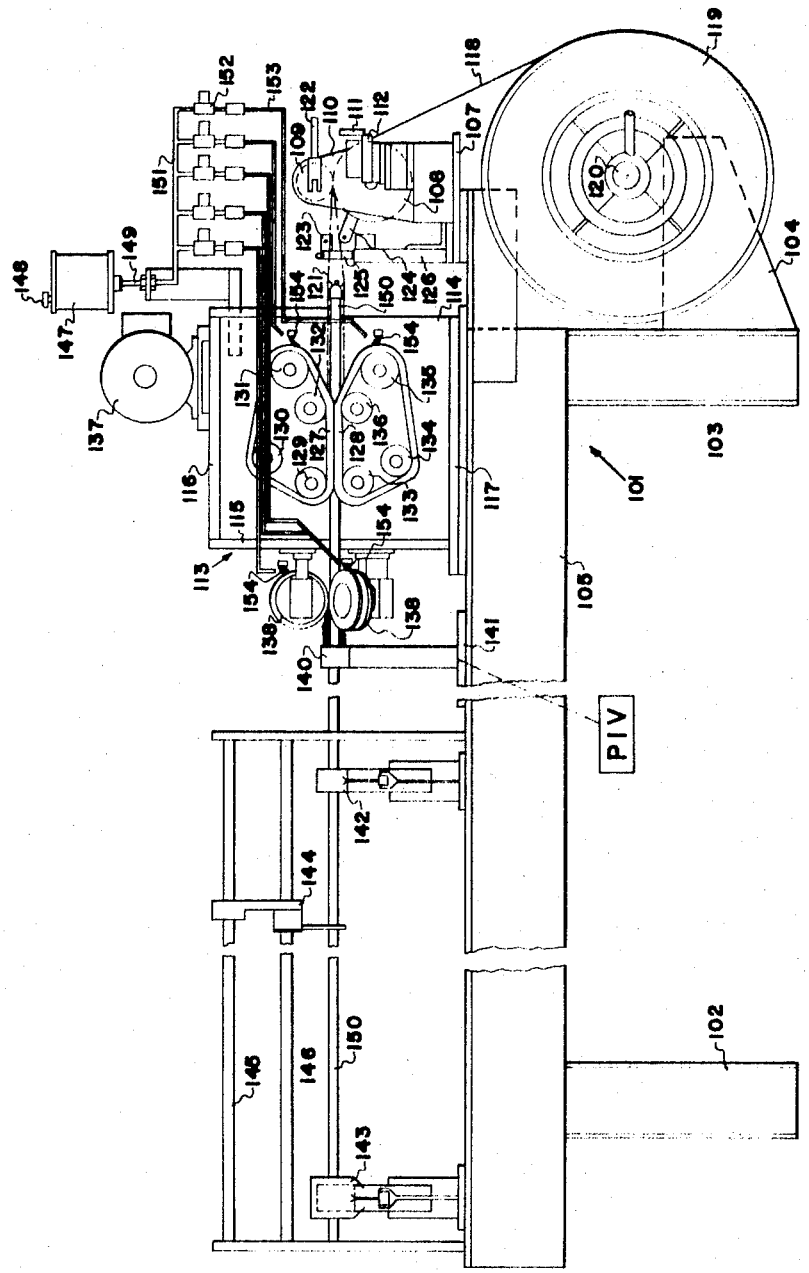
FIG. 2 is a view in elevation of another embodiment of the shirring machine shown in FIG. 1, substituting shirring wheels or rolls for shirring belts.

In FIG. 2 of the drawings my invention is applied to a different type of shirring machine. In this shirring machine, shirring wheels are used in place of the shirring belts shown in FIG. 1, and the degree of compaction of the shirred casing is determined by the rate of withdrawal of a separate shirred casing hold-back mechanism.

In this shirring machine, there is provided a frame which is generally of angle iron and plate welded construction. Frame 101 includes vertically extending angles 102 and 103 and supporting plate 104. At the upper edge of frame 101 is horizontally extending angle 105 on which there is supported plate 107 which carries measuring roll 108 and squeeze roll 109 which are mounted on support plates 110. Cooperating with measuring roll 108 is a metering disc 110 which cooperates with measuring limit switch 112 for stopping further operation of the shirring head when a predetermined length of casing has been shirred.

The shirring head which is generally designated as 113 is supported by upwardly extending plates 114 and 115 and horizontally extending plates 116 and 117. Shirring head 113 is arranged to receive relatively thin-walled synthetic sausage casing 118 from reel 119 which is rotatably mounted on shaft 120 supported on plate members 104. As the casing 118 comes from reel 119, it is flat in the form of reelstock and passes between measuring roll 108 and squeeze roll 109 and is inflated as shown at 121. Squeeze roll 109 is adjustable by lever 22 for initial threading of casing into the machine. The inflated casing is fed over a shirring mandrel 150 and passes between upper and lower rollers 123 and 124. Roller 123 operates a tear limit switch which stops the shirring head in the event that the casing becomes torn, and roller 124 limits the downward movement of roller 123 when the casing is deflated. The casing also passes between guide rollers 125 mounted on upwardly extending arms 126.

The inflated casing 121 next passes between upper and lower feed belts 127 and 128 which cooperate to form a closed circular passage which assists in feeding the casing to the shirring wheels. Feed belt 127 is guided and driven by rollers 129, 130, 131 and 132. Feed belt 128 is driven in coordination with belt 127 by rollers 133, 134, 135 and 136. The drive rollers for the belts 127 and 128 may be driven by motor 137 mounted on plate 116 at the upper end of shirring head 13 or may be driven by any other motor or power source.

The inflated casing 121 is fed into a plurality of shirring wheels 138 which are driven by motor 137 or by any other suitable power source. Shirring wheels 138 do not show the details of the shirring teeth construction but can be in the configuration shown in the Matecki patents, the Clement patent, Arnold Ser. No. 564,961, or any other suitable design.

Figures 3, 4:
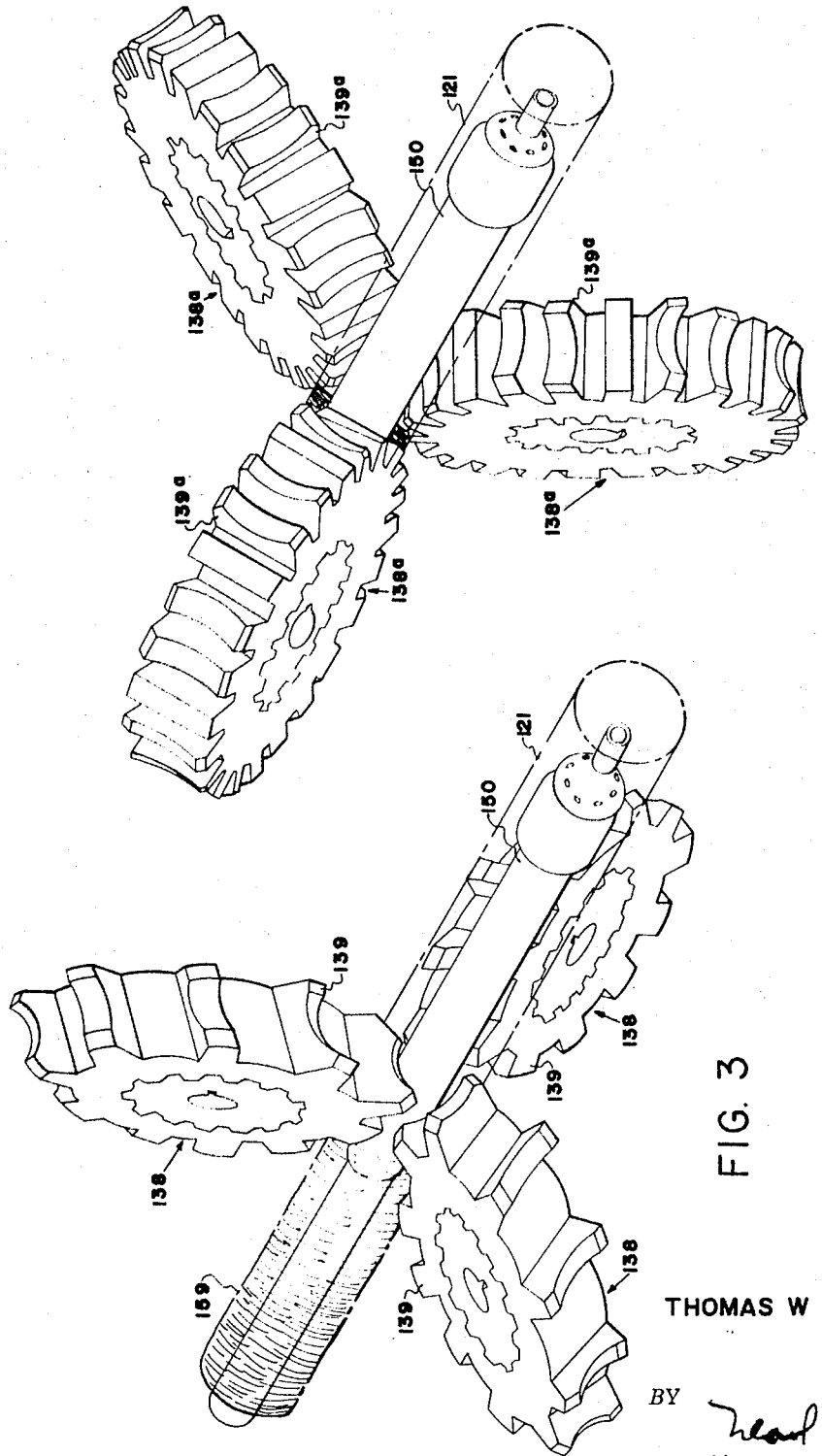
FIG. 3 is an isometric view of shirring wheels and a mandrel used in shirring casing on shirring machines of the type shown in FIGS. 1 and 2.
FIG. 4 is an isometric view of an alternate embodiment of shirring wheels used in this process.

In FIG. 3 there is shown an isometric view of a portion of shirring mandrel 150 and shirring wheels 138, with inflated casing 121 being shown at the front of the mandrel and shirred casing 159 positioned immediately behind the shirring wheels. Shirring wheels 138 are of the type shown in Arnold Ser. No. 564,961 and comprise wheels of a flexible rubber or plastic material having a plurality of essentially identical shirring lugs 139 which are set at an angle on the cylindrical surface of the wheels and which lugs are so designed to be sufficiently rigid as to not be overly deformed by the strand back pressure and which lugs engage the corresponding lugs on adjacent shirring wheels to engage the inflated casing during shirring along a substantially continuous helical line of shirring contact. In FIG. 4 there is shown an isometric view of mandrel 150 and inflated casing 121 passing through shirring wheels 138a having shirring lugs 139a of the type generally shown in the aforementioned Matecki patents. These shirring wheels have lugs 139a arranged to grip the casing around about ⅔ of its circumference and provide no shirring contact with the casing immediately opposite to the lugs which are in engagement with the casing. The lugs of these wheels likewise are designed to have sufficient rigidity to resist deformation during shirring. These shirring wheels are essentially a modification of the shirring arrangement shown in the Blizzard et al. patents and comprise essentially the application of the shirring arrangement shown in the FIG. 7 of Blizzard et al. to shirring wheels instead of shirring belts.

In the apparatus thus far described in FIG. 2, the casing which is shirred by shirring wheels 138 engages a slidable hold-back mechanism 140 which moves along a track 141 on supporting base 105. The details of construction of hold-back mechanism 140 are not essential in this apparatus since it is well known in the prior art. Hold-back mechanism 140 comprises a collar having an opening on one side so that it may move to partially surround mandrel 150 and engage the end of the casing being shirred. Hold-back mechanism 140 is retracted away from the shirring wheels by a positive infinitely variable drive mechanism, designated PIV in the drawing. The PIV controls the rate of withdrawal of hold-back mechanism 140 and is generally operated by the same motor 137 used to drive shirring wheels 138 and feed in belts 127 and 128. The rate of retraction of hold-back mechanism 140 determines the degree of compaction of the shirred casing is effected by shirring wheels 138. Generally, the PIV is adjusted to move hold-back mechanism 140 away from shirring wheels 138 at a rate of one inch per 5–10 feet of casing shirred. This results in the production of a shirred strand of casing having a very high pleat density which is very uniform from end to middle to end of the shirred strand.

At the middle of the apparatus shown in FIG. 2, there is provided a clamp arrangement 142 which supports the middle portion of mandrel 150, which is maintained in a substantially fixed position within the shirring head. At the extreme left end of the shirring machine there is provided another clamp mechanism 143 for supporting the left end of mandrel 150. The mandrel 150 has a construction from the portion adjacent clamp 142 to the end which extends into shirring head 113 which is substantially the same as that shown in FIG. 5. In fact, the compressed air for inflating casing 121 is supplied through clamp 142. When a sufficient amount of casing is shirred by shirring wheels 138, the casing is severed adjacent to the shirring wheels and clamp 142 is opened and the casing moved along mandrel 150 past the open clamp. Hold-back mechanism 140 is then moved back to abut the end of the casing being shirred from shirring wheels 138. Clamp 142 is then closed and slide mechanism 144 (which is mounted o nrods 145 and 146) is moved to the left to further compress the shirred strand of casing, if desired, and/or to eject the casing from mandrel 150 when clamp 142 is closed and supports mandrel 150 when clamp 143 is open for ejection of a shirred strand of casing. Similarly, clamp 143 supports mandrel 150 when clamp 142 is opened for movement of the shirred strand past that clamp.

The apparatus shown in FIG. 2 is provided with a lubricating system which is substantially the same as that used in the shirring machine of FIG. 1. There is provided a storage tank 147 having an inlet 148 and an outlet 149 connected to manifold 151. Manifold 151 is in turn connected to valves 152 to conduits 153 which discharge lubricant to brushes 154 adjacent to feed in belts 127 and 128 and shirring wheels 138.

The apparatus described in FIG. 2 was used to prepare high density shirred strands of cellulosic casing for commercial sale. These strands contained 160 feet of casing in a strand approximately 20 inches long, having a strand density of 8 feet of shirred casing per inch of strand. The apparatus used was that shown in FIG. 2 using the shirring wheels of FIG. 3. The shirring wheels had a radius of 2.112 in. from the center of the wheel to the bottom of the groove of the shirring lug. Each wheel had 12 equally spaced lugs with the lugs set at an angle of 30–33°. The lugs had a width of 0.5 in. and a groove radius of 0.328 in. The mandrel 150 had a diameter of 0.605 in. at the sleeve portion 48a and a drop off of 0.030 in. at 51a. The casing shirred on the apparatus had a circumference of 2.4–2.6 in. The casing was inflated under an internal air pressure of 20 p.s.i.g. and was lubricated by application of oil through brushes 154 and on the interior through mandrel 150 at the rate of about 15 drops of oil per 160 foot strand (20 inch shirred length). The strand hold-back device 140 was adjusted in the rate of movement in its traverse mechanism by means of the PIV transmission between the drive from motor 137 and the traversing mechanism for the hold-back device. The rate of movement was set at one inch of movement per 6.2 feet of casing shirred. This arrangement produced a 160 foot strand having a shirred length of 26 inches. The 26-inch strand was then subjected to ram compression by compression member 144 to a compressed length of 20 inches, viz a strand density of eight feet per inch of shirred strand.

In carrying out high density shirring in accordance with this invention it is necessary that the lugs on the shirring wheels or shirring belts be sufficiently stiff to produce the desired degree of pressure. When the apparatus just described was used with shirring wheels having ⅜ inch lugs the casing tended to jam when shirred to high densities. It is also necessary that the drop off 51a be positioned about ¾ of an inch or more away from the shirring wheel axis. When the drop off position 51a was moved to a point only ¼ inch from the wheel axis the casing shirred back under the wheels. It has also been found that sufficient air pressure must be maintained within the inflated casing to produce a good shirring pattern. When the air pressure was reduced to 5 p.s.i.g. the strand tended to be quite irregular. It has also been found that insufficient lubrication may result in the jamming of casing and physical damage to the casing when attempting to produce high density shirred strands.

In other experiments, the PIV setting was varied to different values ranging as high as 8.5 feet of shirred casing per inch of retraction of hold-back mechanism 140. This produced shirred strands having uniform pleat densities up to about 8.5 feet of shirred casing per inch of shirred strand.

When casing is shirred in accordance with this invention using shirring belts as shown in FIG. 1 or shirring wheels of the type shown in FIG. 3 or 4 or as in the aforementioned Clement patent casing strands are produced of high shirred pleat density which are uniform in density from end to middle to end. Shirring densities of the order to 5–10 feet of casing shirred per inch of shirred strand have been produced without damage to the casing. In each case the desired degree of compression and the desired uniformity of pleat density was accomplished by adjusting the rate of withdrawal of the hold-back means for the shirred casing to a value in the range of about one inch of movement per 5–10 feet of casing shirred.

While the invention may be used with shirring belts or with various types of shirring wheels, it is generally preferred to use shirring wheels of the type shown in FIG. 3. The wheels may be made of any composition which can yield a smooth wear resistant surface. The lug width is not critical but should be sufficient to provide sufficient rigidity to advance the strand as it is formed so that the conical surface of the shirred strand being formed does not travel back under the wheels and bind on the mandrel. The thickness required depends not only on the composition but also on the number of lugs. Less thickness of the lugs is required when a large number of lugs is used on a given diameter wheel. The lug angle may vary between 0 and 35° from the plane of rotation. The spacing between the lug surface and the mandrel may be in the range from about 0.003–0.060 in. with 0.010–0.030 in. preferred. The mandrel size to be used depends upon the casing being shirred. The ratio of casing to mandrel diameter may vary between about 1.3 and 1.6 and is preferably in the range from about 1.45–1.55. When floating mandrel type machines, as shown in FIG. 2, are used, the drop off position 51a is in the range from about 0.50–1.0 in., preferably about 0.7–0.9 in., from the axis of the shirring wheels. The height of the drop off 51a is in the range from about 0.02–0.05 in. and is preferably about 0.025–0.035 in. The internal air pressure used for inflating the casing during shirring may vary between about 8 and 25 p.s.i.g., and is preferably about 18–22 p.s.i.g. As previously noted, proper lubrication, both inside and outside the casing is essential. An internal oil feed of about one drop of oil per 10–40 feet of casing and an external feed of about ½ to 1½ drops of oil per ten feet of casing is preferred. More oil may be used but is unnecessary and sometimes increases the possibility of casing damage. External oil is applied on the feed belts or wheels or may be applied by a special applicator rubbing against the casing.

Simple experimentation using the above conditions of lug to mandrel and casing to mandrel spacings, mandrel drop off dimensions and positions, internal air pressure, and lubrication will enable one to find the proper relationships required to effect high density shirring without the necessity of additional ram compression for any given wheel design or composition or casing size.

While this invention has been described fully and completely with special emphasis upon several preferred embodiments thereof it should be understood that the invention may be practiced otherwise than as specifically described herein.

What is claimed is:

1. In a process for shirring synthetic sausage casings wherein a casing is inflated by gas pressure, drawn over a hollow mandrel, and shirred by continuous application of shirring forces by means of belts or wheels having lugs engageable with inflated casing around the periphery of the casing and at closely spaced longitudinal intervals, the improvement which comprises shirring said casing against a longitudinal retractable hold-back means which is retracted at a rate of 1 inch for each 5–10 feet of casing shirred while maintaining an internal gas pressure of 8–25 p.s.i.g. within the inflated casing.

2. A process as defined in claim 1 in which the shirring lugs cooperate to apply shirring forces to said casing along a continuous helical line.

3. A process as defined in claim 1 in which the hold-back means comprises abutment means on said mandrel and the mandrel is retracted from the point of application of said shirring forces.

4. A process as defined in claim 1 in which the shirred casing is moved along said mandrel against the back pressure of said retractable hold-back means.

5. A process as defined in claim 1 in which the shirred casing is severed into pieces of predetermined length and then compressed to a predetermined shorter length.

6. A process as defined in claim 1 in which sufficient lubricant is supplied through the mandrel to prevent the casing from binding on the mandrel.

References Cited

UNITED STATES PATENTS

| | | | |
|---|---|---|---|
| 3,110,058 | 11/1963 | Marbach | 17—42 |
| 3,112,517 | 12/1963 | Ives | 17—42 |
| 3,209,398 | 10/1965 | Ziolko | 17—42 |
| 3,315,300 | 4/1967 | Ziolko | 17—42 |

LUCIE H. LAUDENSLAGER, Primary Examiner

U.S. Cl. X.R.

17—42; 99—176

UNITED STATES PATENT OFFICE
CERTIFICATE OF CORRECTION

Patent No. 3,456,286  Dated July 22, 1969

Inventor(s) Thomas W. Martinek

It is certified that error appears in the above-identified patent and that said Letters Patent are hereby corrected as shown below:

Column 3, line 19, "stirred" should read -- shirred --. Column 4, line 63, "or" should read -- of --. Column 5, line 54, cancel "to". Column 8, after line 28, insert -- justed to a value in the range of one inch per 5-10 ft. of --. Column 9, line 3, "22" should read -- 122 --; line 21, "13" should read -- 113 --. Column 10, line 27, "o nrods" should read -- on rods --. Column 12, line 2, after "essential" insert a period.

Signed and sealed this 6th day of June 1972.

(SEAL)
Attest:

EDWARD M. FLETCHER, JR.
Attesting Officer

ROBERT GOTTSCHALK
Commissioner of Patents